US008290294B2

(12) United States Patent
Kopf et al.

(10) Patent No.: US 8,290,294 B2
(45) Date of Patent: Oct. 16, 2012

(54) DEHAZING AN IMAGE USING A THREE-DIMENSIONAL REFERENCE MODEL

(75) Inventors: Johannes P. Kopf, Hamburg (DE); Michael F. Cohen, Seattle, WA (US); Daniel Lischinski, Jerusalem (IL); Matthieu T. Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 12/211,512

(22) Filed: Sep. 16, 2008

(65) Prior Publication Data

US 2010/0067823 A1 Mar. 18, 2010

(51) Int. Cl.
*G06K 9/40* (2006.01)
*G06K 9/36* (2006.01)

(52) U.S. Cl. ........ 382/274; 382/167; 382/254; 382/275; 382/285

(58) Field of Classification Search .................. 382/274, 382/167, 254, 275, 285
See application file for complete search history.

(56) References Cited

U.S. PATENT DOCUMENTS

| | | | | |
|---|---|---|---|---|
| 5,179,638 A * | 1/1993 | Dawson et al. | ............... | 345/582 |
| 5,245,417 A * | 9/1993 | Hibi et al. | ..................... | 358/515 |
| 5,487,020 A * | 1/1996 | Long | .............. | 382/167 |
| 5,572,635 A * | 11/1996 | Takizawa et al. | ............. | 345/426 |
| 6,016,150 A | 1/2000 | Lengyel | | |
| 6,148,090 A | 11/2000 | Narioka | | |
| 6,184,891 B1 * | 2/2001 | Blinn | ............................ | 345/426 |
| 6,462,768 B1 * | 10/2002 | Oakley | ............................ | 348/31 |
| 6,868,190 B1 * | 3/2005 | Morton | ........................ | 382/278 |
| 6,919,892 B1 | 7/2005 | Cheiky | | |
| 7,363,157 B1 | 4/2008 | Hanna | | |
| 7,397,970 B2 * | 7/2008 | Han et al. | ...................... | 382/281 |
| 7,426,304 B2 * | 9/2008 | Cheung et al. | ................ | 382/232 |
| 7,889,916 B2 * | 2/2011 | Miyaki | ......................... | 382/162 |
| 2005/0030315 A1 | 2/2005 | Cohen | | |
| 2008/0123960 A1 * | 5/2008 | Kim et al. | ..................... | 382/173 |
| 2008/0150943 A1 | 6/2008 | LeFrancois | | |

FOREIGN PATENT DOCUMENTS

WO WO 2007083307 A2 * 7/2007

OTHER PUBLICATIONS

Du, et al. "Haze Detection and Removal in High Resolution Satellite Image with Wavelet Analysis." IEEE Transactions in Geoscience and Remote Sensing. 40.1 (2002): 210-217. Print.*
Zhang, et al. "Fast Color Correction using Principal Regions Mapping in Different Color Spaces." Real-Time Imaging. 10. (2004): 23-30. Print.*
Tan, et al. "Visibility Enhancement for Roads with Foggy or Hazy Scenes." Intelligent Vehicles Symposium, 2007 IEEE . (2007): 19-24. Print.*

(Continued)

*Primary Examiner* — Michael A Newman
(74) *Attorney, Agent, or Firm* — Lyon & Harr, LLP; Mark A. Watson (57) ABSTRACT

An image may be dehazed using a three-dimensional reference model. In an example embodiment, a device-implemented method for dehazing includes acts of registering, estimating, and producing. An image that includes haze is registered to a reference model. A haze curve is estimated for the image based on a relationship between colors in the image and colors and depths of the reference model. A dehazed image is produced by using the estimated haze curve to reduce the haze of the image.

20 Claims, 7 Drawing Sheets

OTHER PUBLICATIONS

Narasimhan, et al. "All the Images of An Outdoor Scene." ECCV 2002, LNCS. 2352. (2002): 148-162. Print.*

Liang, et al. "Atmospheric Correction of Landsat ETM Land Surface Imagery: II. Validation and Applications." IEEE Transactions on Geoscience and Remote Sensing. (2002): 1-10. Print.*

Narasimhan, et al. "Removing Weather Effects from Monochrome Images." Computer Vision and Pattern Recognition, 2001. CVPR 2001. Proceedings of the 2001 IEEE Computer Society Conference on . 2. (2001): 186-193. Print.*

Oakley, et al. "Correction of Simple Contrast Loss in Color Images." IEEE Transactions on Image Processing. 16.2 (2007): 511-522. Print.*

Fattal, Raanan. "Single Image Dehazing." ACM Transactions on Graphics. 27.3 (2008): 1-10. Print.*

Umeda, et al. "Correction of Color Information of a 3D Model Using a Range Intensity Image." Proceedings of the Fifth International Conference on 3-D Digital Imaging and Modeling. (2005): 229-236. Print.*

Schechner, et al. "Instant Dehazing of Images Using Polarization." Proceedings of Computer Vision & Pattern Recognition. 1. (2001): 325-332. Print.*

Ashikhmin, M., Synthesizing natural textures, Proc. of ACM Symposium on Interactive 3D Graphics, Mar. 2001, pp. 217-226, ACM Press, New York, NY, USA.

Chen, B., G. Ramos, E. Ofek, M. Cohen, S. Drucker, and D. Nister, Interactive techniques for registering images to digital terrain and building models, Microsoft Technical Report, MSR-TR-2008-115, Aug. 2008, pp. 1-10.

Cho, P. L., 3D Organization of 2D Urban Imagery, Proc. of the 36th Applied Imagery Pattern Recognition Workshop, Oct. 2007, pp. 3-8, Washington, DC, USA.

Criminisi, A., I. Reid, A. Zisserman, Single View Metrology, Int'l J. of Comp. Vision, Nov. 2000, vol. 40, No. 2, pp. 123-148.

Debevec, P. E., C. J. Taylor, J. Malik, Modeling and rendering architecture from photographs: A hybrid geometry and image-based approach, Proc. of the 23rd Annual Conf. on Comp. Graphics and Interactive Techniques, Aug. 1996, pp. 11-20, ACM New York, NY, USA.

Debevec, P., T. Hawkins, C. Tchou, H.-P. Duiker, W. Sarokin, M. Sagar, Acquiring the reflectance field of a human face, Proc. of SIGGRAPH 2000, Computer Graphics Proceedings, Annual Conference Series, Jul. 2000, pp. 145-156.

Drori, I., D. Cohen-Or, Y. Yeshurun, Fragment-based image completion, ACM Transactions on Graphics, Jul. 2003, pp. 303-312, vol. 22, No. 3.

Efros, A. A., T. K. Leung, Texture synthesis by non-parametric sampling, Proc. of Int'l Conf. on Comp. Vision, Sep. 1999, pp. 1033-1038, vol. 2, IEEE Computer Society Washington, DC, USA.

Früh, C., A. Zakhor, Constructing 3D city models by merging aerial and ground views, IEEE Comp. Graphics and Applications, Nov./Dec. 2003, pp. 52-61, vol. 23, No. 6.

Google, Inc., Google Earth User Guide, retrieved Jul. 16, 2008 from http://earth.google.com/userguide/v4/ug_mapfeatures.html.

Hays, J., Efros, A. A., Scene completion using millions of photographs, ACM Trans. Graph., Jul. 2007, vol. 26, No. 3.

Hertzmann, A., C. E. Jacobs, N. Oliver, B. Curless, D. Salesin, Image analogies, Proc. of the 28th Annual Conf. on Comp. Graphics, Los Angeles, Aug. 2001, pp. 327-340.

Hoiem, D., A. A. Efros, M. Hebert, Automatic photo pop-up, ACM Trans. Graph., Jul. 2005, vol. 24, No. 3, pp. 577-584.

Horry, Y., K. Anjyo, K. Arai, Tour into the picture: Using a spidery mesh interface to make animation from a single image, Proc. of the 24th Annual Conf. on Comp. Graphics, Aug. 1997, pp. 225-232, Los Angeles, CA, USA.

Kaftory, R., Y. Y. Schnechner, Y. Y. Zeevi, Variational distance-dependent image restoration, IEEE Comp. Soc. Conf. on Comp. Vision and Pattern Recognition, Jun. 2007, Minneapolis, Minnesota, USA.

Kang, S. B., Depth Painting for Image-Based Rendering Applications, Tech. Rep. CRL, Compaq Computer Corporation, Cambridge Research Lab., Dec. 1998.

Lalonde, J.-F., D. Hoiem, A. A. Efros, C. Rother, J. M. Winn, A. Criminisi, Photo clip art, ACM Trans. Graph., vol. 26, No .3, Jul. 2007.

Loscos, C., G. Drettakis, L. Robert, Interactive virtual relighting of real scenes, IEEE Transactions on Visualization and Computer Graphics, Oct.-Dec. 2000, vol. 6, No. 4, pp. 289-305.

Narasimhan, S. G., S. K. Nayar, Contrast restoration of weather degraded images, IEEE Trans. Pattern Anal. Mach. Intell., Jun. 2003, vol. 25, No. 6, pp. 713-724.

Narasimhan, S. G., S. Nayar, Interactive (de)weathering of an image using physical models, IEEE Workshop on Color and Photometric Methods in Comp. Vision, In Conjunction with ICCV, Oct. 2003.

Natural Graphics, Natural scene designer 5.0, retrieved Jul. 16, 2008 from http://www.naturalgfx.com/index.htm.

Nayar, S. K., S. G. Narasimhan, Vision in bad weather, Int'l Conf. on Comp. Vision, Sep. 1999, pp. 820-827, Kerkyra, Corfu, Greece.

Oakley, J. P., Satherley, B. L., Improving image quality in poor visibility conditions using a physical model for contrast degradation, IEEE Transactions on Image Processing, Feb. 1998, vol. 7, No. 2, pp. 167-179, Sch. of Eng., Manchester Univ.

Oh, B. M., M. Chen, J. Dorsey, F. Durand, Image-based modeling and photo editing, Proc. of the 28th Annual Conf. on Comp. Graphics, Aug. 2001, pp. 433-442, Los Angeles, California, USA.

Schechner, Y. Y., Y. Averbuch, Regularized image recovery in scattering media, IEEE Trans. Pattern Anal. Mach. Intell., Sep. 2007, vol. 29, No. 9, pp. 1655-1660.

Schechner, Y. Y., S. G. Narasimhan, S. K. Nayar, Polarization-based vision through haze, Applied Optics, Jan. 2003, vol. 42, No. 3, pp. 511-525.

Schechner, Y. Y., S. G. Narasimhan, S. K. Nayar, Instant dehazing of images using polarization, IEEE Comp. Society Conf. on Comp. Vision and Pattern Recognition, Image Formation and Early Vision, Dec. 2001, pp. 325-332, Kauai, HI, USA.

Shade, J., S. J. Gortler, L.-W. He, R. Szeliski, Layered depth images, Proc. of the 25th Annual Conf. on Comp. Graphics, Jul. 1998, pp. 231-242, Orlando, FL, USA.

Shum, H.-Y. M. Han, R. Szeliski, Interactive construction of 3D models from panoramic mosaics, Conf. on Comp. Vision and Pattern Recognition, Jun. 1998, pp. 427-433, Santa Barbara, CA, USA.

Snavely, N., S. M. Seitz, R. Szeliski, Photo tourism: Exploring photo collections in 3D, ACM Transactions on Graphics, Jul. 2006, vol. 25, No. 3, pp. 835-846.

Stamos, I., P. K. Allen, 3-D model construction using range and image data, 2000 Conf. on Comp. Vision and Pattern Recognition, Jun. 2000, pp. 1531-1536, Hilton Head, SC, USA.

Sunkavalli, K., W. Matusik, H. P., S. Rusinkiewicz, Factored time-lapse video, ACM Trans. Graph., Jul. 2007, vol. 26, No. 3.

Takase, Y., N. Sho, A. Sone, K. Shimiya, Automatic generation of 3D city models and related applications, Int'l Archives of Photogrammetry, Remote Sensing and Spatial Info. Sciences, Int'l Workshop Visualization and Animation of Reality-based 3D Models, vol. XXXIV-5/W10, Feb. 2003, pp. 113-120, Tarasp, Switzerland.

Tan, R. T., Visibility in bad weather from a single image, 2008 IEEE Comp. Soc. Conf. on Comp. Vision and Pattern Recognition, Jun. 2008, Anchorage, Alaska, USA.

Toyama, K., R. Logan, A. Roseway, Geographic location tags on digital images, Proc. of the Eleventh ACM Int'l Conf. on Multimedia, Nov. 2003, pp. 156-166, Berkeley, CA, USA.

Wang, J., M. Agrawala, M. F. Cohen, Soft scissors: An interactive tool for realtime high quality matting, ACM Trans. Graph., Jul. 2007, vol. 26, No. 3.

Yu, Y., J. Malik, Recovering photometric properties of architectural scenes from photographs, Proc. of the 25th Annual Conf. on Comp. Graphics, Jul. 1998, pp. 207-217, Orlando, FL, USA.

Yu, Y., P. E. Debevec, J. Malik, T. Hawkins, Inverse global illumination: Recovering reflectance models of real scenes from photographs, Proc. of the 26th Annual Conf. on Comp. Graphics, Aug. 1999, pp. 215-224, Los Angeles, California, USA.

Zhang, L., G. Dugas-Phocion, J.-S. Samson, S. M. Seitz, Single-view modelling of free-form scenes, J. of Visualization and Comp. Animation, Sep. 2002, vol. 13, No. 4, pp. 225-235.

Zhang, Z., S. Zheng, J. Zhang, Development of a browser for traffic line and terrain landscape, Int'l Archives of Photogrammetry, Remote Sensing and Spatial Info. Sciences, Int'l Workshop on Visualization and Animation of Landscape, vol. XXXIV-5/W3, Feb. 2002, Kunming, China.

Janice Kau, U.S. Appl. No. 12/211,596, U.S. Final Office Action, Feb. 2, 2012.

Janice Kau, U.S. Appl. No. 12/211,596, U.S. Office Action, Sep. 2, 2011.

* cited by examiner

DEHAZING AN IMAGE USING A THREE-DIMENSIONAL REFERENCE MODEL

BACKGROUND

When a photograph is taken by a camera, an image is collected by a lens and retained in some medium. Historically, the medium was typically 35 mm or some other type of film. Over the last decade or so, the medium has increasingly become digital memory. Digital cameras have become the preferred camera choice, even for many professional photographers. Digital cameras send captured images "directly" to digital memory. Of course, photographs taken with traditional film cameras can be scanned and converted into digital images. Regardless of the path taken by the image to become digitally-stored, the digital image may be manipulated in different manners for different purposes.

When images are captured outdoors, haze tends to adversely impact the quality of the background. More specifically, weather and other atmospheric phenomena, such as haze, greatly reduce the visibility of distant regions in images of outdoor scenes. Manipulating a digital image to remove the effect of haze, often termed "dehazing", is a challenging problem. Existing approaches require multiple images that are taken under different weather conditions and/or produce unsatisfactory results.

SUMMARY

An image may be dehazed using a three-dimensional reference model. In an example embodiment, a device-implemented method for dehazing includes acts of registering, estimating, and producing. An image that includes haze is registered to a reference model. A haze curve is estimated for the image based on a relationship between colors in the image and colors and depths of the reference model. A dehazed image is produced by using the estimated haze curve to reduce the haze of the image.

In another example embodiment, processor-accessible tangible media include processor-executable instructions for dehazing an image. The processor-executable instructions, when executed, direct a device to perform the following acts: Compute an average model texture color over at least one depth range for a reference model. Compute an average hazy image color over the depth range for the image. Compute an estimated haze curve for the image based on the average model texture color and responsive to the average hazy image color. Restore contrasts in the image using the estimated haze curve to thereby dehaze the image and produce a dehazed image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

Many of the images that people typically take are of a spectacular, often well-known landscape or cityscape. Unfortunately, in many cases the lighting conditions or the weather are not optimal when the photographic images are taken. The resulting images may be dull or hazy. As explained herein above, dehazing an image is a challenging problem that has yet to be solved in a fully satisfactory manner with existing approaches.

Despite the increasing ubiquity of digital photography, the metaphors used to browse and interact with photographic images have not changed significantly. With few exceptions, they are still treated as two-dimensional entities, whether they are displayed on a computer monitor or printed as a hard copy. Yet it is known that augmenting an image with depth information can open the door to a variety of new and exciting manipulations. Unfortunately, inferring depth information from a single image that was captured with an ordinary camera is still a longstanding unsolved problem in computer vision.

Fortunately, there is a great increase of late in the number and the accuracy of geometric models of the world, including both terrain and buildings. By registering images to these reference models, depth information can become available at each pixel of the image. This geo-registering enables a number of applications that are afforded by these newfound depth values, as well as the many other types of information that are typically associated with such reference models. These applications include, but are not limited to: dehazing (or adding haze to) images, approximating changes in lighting, novel view synthesis, expanding the field of view, adding new objects into the image, integration of GIS data into the photo browser, and so forth.

An image manipulation system that involves geo-registering is motivated by several recent trends that are now reaching critical mass. One trend is that of geo-tagged photos. Many photo-sharing web sites now enable users to manually add location information to photos. Some digital cameras feature a built-in GPS, allowing automatic location tagging. Also, a number of manufacturers offer small GPS units that allow photos to be easily geo-tagged by software that synchronizes the GPS log with the photos. In addition, location tags can be enhanced by digital compasses that are able to measure the orientation (e.g., tilt and heading) of the camera. It is expected that in the future more cameras will have such functionality and that most photographic images will be geo-tagged, even without manual efforts.

Another trend is the widespread availability of accurate digital terrain models, as well as detailed urban models. The combination of geo-tagging and the availability of fairly accurate three-dimensional (3D) models enable many images to be relatively precisely geo-registered. In the near future, partially or fully automatic geo-registration is likely to be available as an online service.

Having a sufficiently accurate match between an image and a 3D geometric model offers new possibilities for enhancing images, especially those including an outdoor and/or scenic component. For example, haze and unwanted color shifts may be removed, alternative lighting conditions may be experimented with, images may be completed, viewpoints may be synthesized, and so forth. These manipulations may be performed even on single outdoor images, which are taken in a casual manner without any special equipment or any particular setup. As a result, they can be applicable to a large body of existing outdoor photographic images, so long as at least the rough location where each photograph was taken is determinable.

Thus, in contrast with existing single-image dehazing approaches, certain example embodiments that are described herein leverage the availability of increasingly accurate 3D reference models. Embodiments may employ a data-driven dehazing procedure that is capable of performing effective, stable, and aesthetically-pleasing contrast restorations, usually even of extremely distant regions.

Generally, example system embodiments are described for enhancing and otherwise manipulating outdoor photographic images by "combining" them with already-existing, geo-referenced digital terrain and urban models. An interactive registration process may be used to align an image with such a reference model. After the image and the model have been registered, an abundance of information becomes available to the system. Examples of available information include depth, texture, color, geographic information system (GIS) data, combinations thereof, and so forth.

This information enables a variety of operations, ranging from dehazing and relighting of the image, to novel view synthesis and overlaying of the image with geographic information. Augmenting photographic images with already-available 3D models of the world can support a wide variety of new ways for people to experience and interact with everyday snapshots. The description that follows focuses on example approaches to dehazing images.

Figure 1:
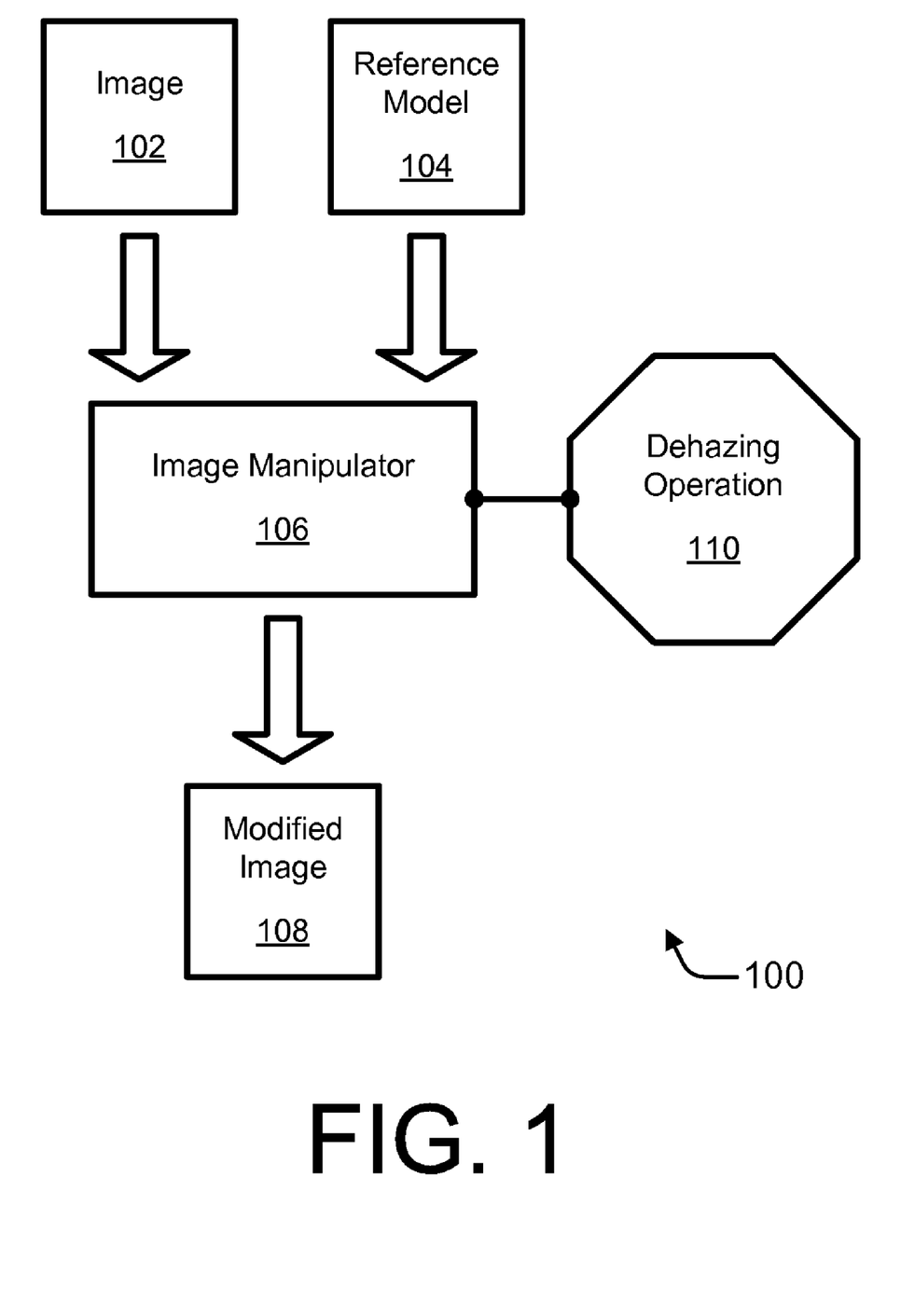
FIG. 1 illustrates an example of a general approach to producing a modified image with a dehazing operation using an image manipulator and based on a reference model.

FIG. 1 illustrates an example of a general approach 100 to producing a modified image 108 with a dehazing operation 110 using an image manipulator 106 and based on a reference model 104. As illustrated, approach 100 includes an image 102, reference model 104, image manipulator 106, modified image 108, and dehazing operation 110. Image 102 may be, for example, any digital two-dimensional image, such as those taken by digital or traditional-film cameras. Reference model 104 provides one or more 3D models of the real-world. Examples of reference models 104 are described further herein below with particular reference to FIG. 2.

Figure 2:
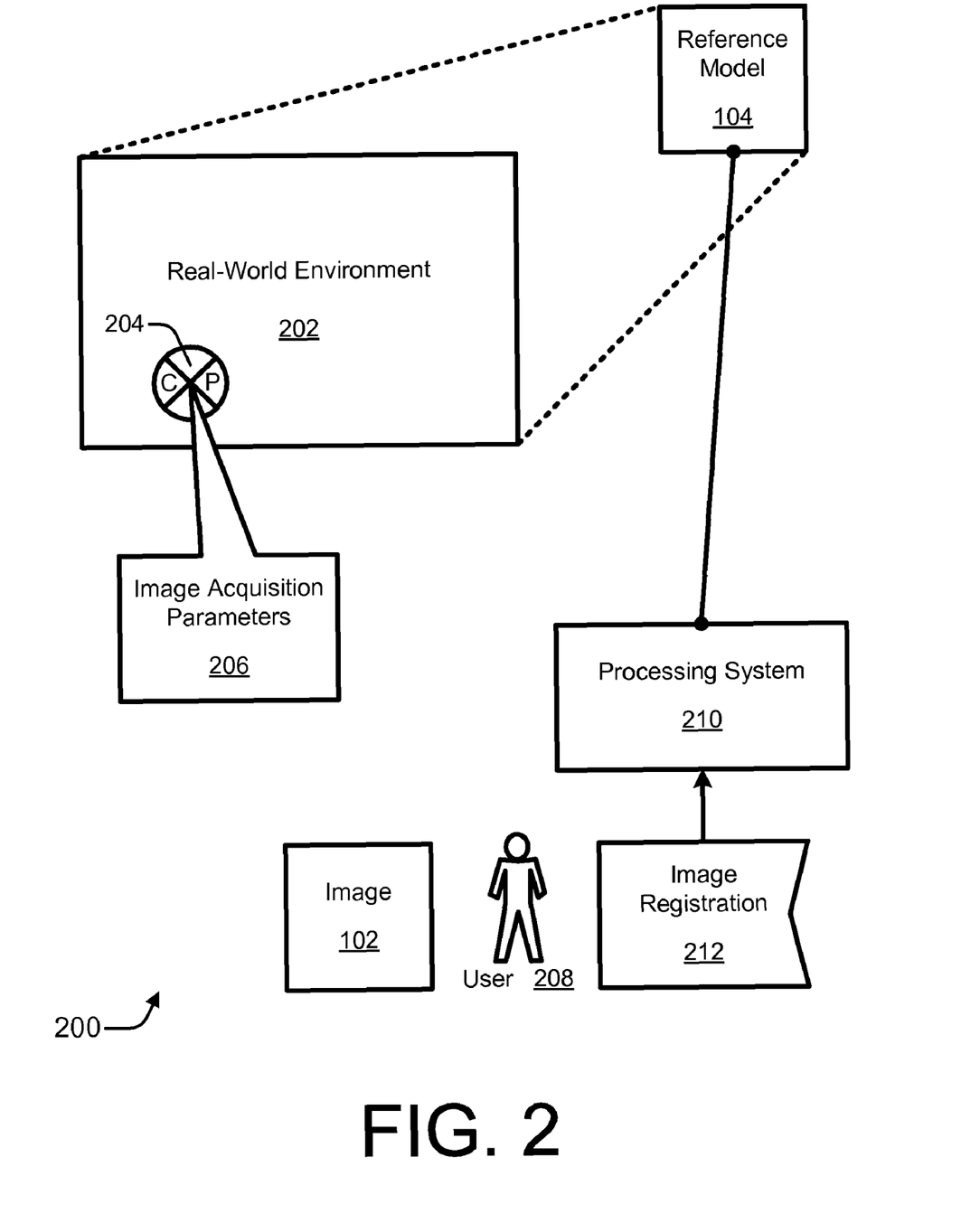
FIG. 2 illustrates an example of a general scheme for registering an image with a reference model.

In an example embodiment, image 102 and reference model 104 are provided to image manipulator 106. Image 102 is registered in conjunction with reference model 104. Image manipulator 106 performs a dehazing operation 110 to produce modified image 108. Modified image 108 is a dehazed version of image 102. As described further herein below, dehazing operation 110 entails estimating a haze curve for image 102 based on a relationship between colors in image 102 and colors of reference model 104. Image manipulator 106 may be realized as software, firmware, hardware, fixed logic circuitry, some combination thereof, and so forth FIG. 2 illustrates an example of a general scheme 200 for registering image 102 with reference model 104. As illustrated, scheme 200 includes a real-world environment 202, a camera (or capture) position 204, image acquisition parameters 206, and a user 208. Scheme 200 also includes a processing system 210 and an image registration 212 in addition to image 102 and reference model 104.

In an example embodiment, reference model 104 generally corresponds to real-world environment 202. More specifically, but by way of example only, respective individual locations, points, and visible subject matter of real-world environment 202 correspond to respective 3D maps, pixels, and textures of reference model 104. Processing system 210 includes or otherwise has access to reference model 104. Processing system 210 may be a discrete device or a distributed set of two or more devices interconnected by a network and formed from software, firmware, hardware, or fixed logic circuitry, some combination thereof, and so forth. Processing system 210 may include image manipulator 106 (of FIG. 1).

Reference models 104 may be created or acquired from any of many possible sources. For example, due to commercial projects that attempt to reproduce the Earth visually on the web, both the quantity and the quality of such models are rapidly increasing. In the public domain, NASA for instance provides detailed satellite imagery (e.g., from Landsat) and elevation models (e.g., from Shuttle Radar Topography Mission). Also, a number of cities around the world are creating detailed 3D models of their cityscape (e.g., New York, Berlin 3D, etc.).

It should be noted that while the reference models that are mentioned herein are fairly detailed, they are still far from the degree of accuracy and the level of detail one would need in order to use these models alone to directly render photographic-quality images. Instead, the 3D information afforded by the use of these models may be leveraged while at the same time the photographic qualities of the original image may be at least largely preserved.

Initially, a user 208 captures image 102 in real-world environment 202 at camera position 204. Associated with this camera position 204 and the act of capturing image 102 are image acquisition parameters 206. Using processing system 210, user 208 performs image registration 212 to register image 102 in conjunction with one or more reference models 104. In this manner, one or more parameters of image acquisition parameters 206 are used to link image 102 to the data in reference model 104. The registration process may be fully or partially manual or automatic.

Assuming that image 102 has been captured by a, e.g., pin-hole camera, image acquisition parameters 206 may include position, pose, and focal length (e.g., seven parameters in total). To register such an image to a 3D geometric model of a scene, it suffices to specify four or more corresponding pairs of points. By way of example, camera position 204 may be specified for image registration 212 with a location (e.g., spatially in three dimensions) and three angles of the camera (e.g., two directional angles and one field of view angle). Assuming that the approximate position (e.g., camera position 204) from which the image was taken is available (e.g., from a geotag, as provided independently from the user, etc.), the model may be rendered from roughly the correct position. If the user specifies sufficiently numerous correspondences between the image and the reference model, the parameters may be recovered by solving a nonlinear system of equations.

It should be noted that haze primarily affects relatively remote objects in the background of an image but not relatively closes objects in the foreground of the image. Consequently, dehazing need not be performed on foreground objects. Moreover, reference models are less likely to include models of foreground objects that are dynamic or less permanent, such as people, cars, and even individual trees. For images depicting foreground objects that are not contained in the reference model, the user may matte out the foreground before combining the remainder of the image with the reference model. Usually, for the dehazing applications described herein, the matte does not need to be overly accurate, especially if it is conservative (e.g., substantially all of the foreground pixels are contained in the matte).

When the foreground is manually matted out by the user, the matting process can typically be completed in about 1-2 minutes per image. So, for some images, the user first spends some time on interactive matting prior to image manipulation. It should be noted that as a consequence of the matting, the fidelity of some of the image manipulations with regard to the foreground may be reduced. After the image manipulations, the matted foreground may be composited back into the overall photographic image.

Figure 3:
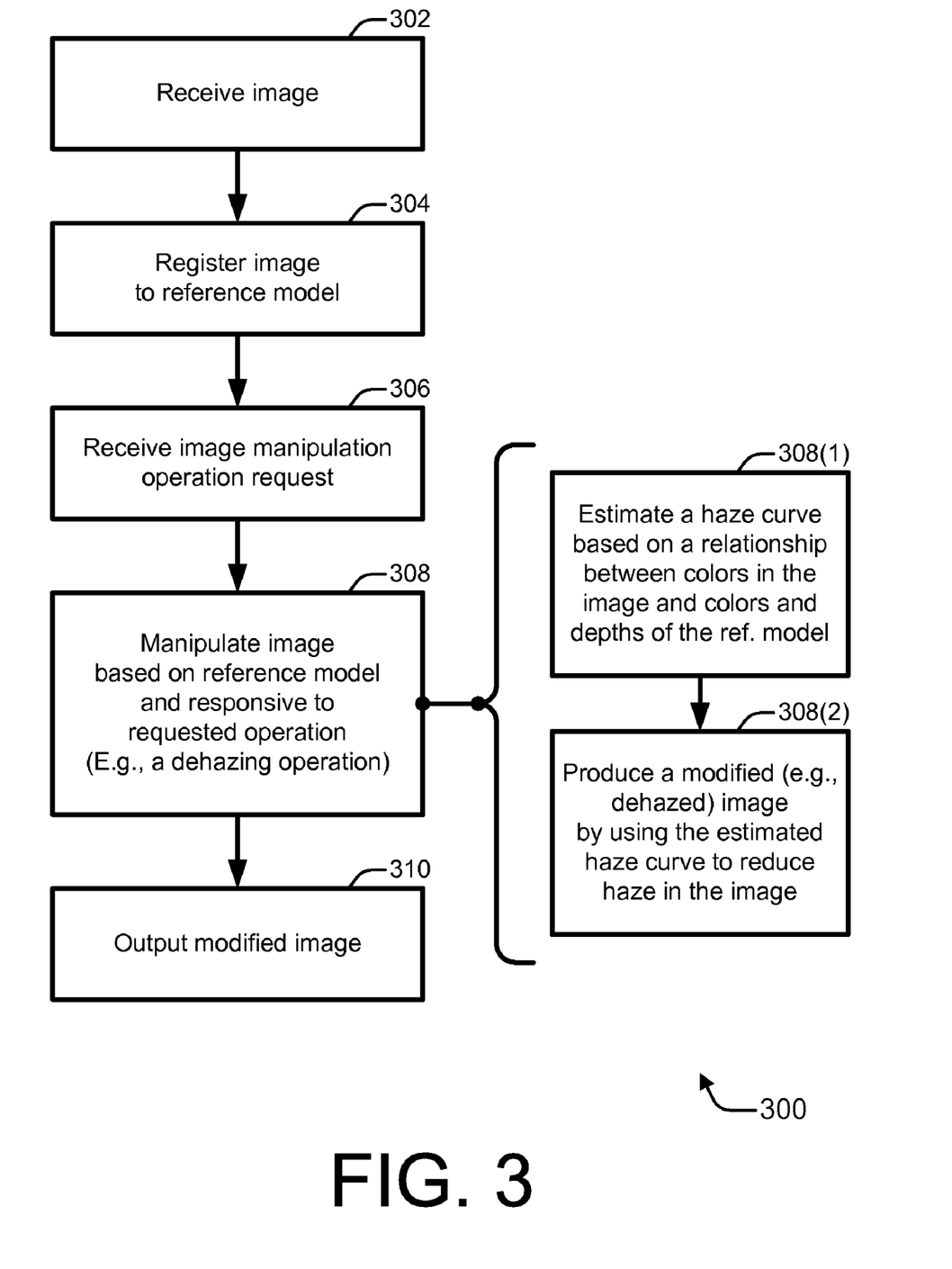
FIG. 3 is a flow diagram that illustrates an example of a method for manipulating an image to dehaze the image based on a reference model.

FIG. 3 is a flow diagram 300 that illustrates an example of a method for manipulating an image to dehaze the image based on a reference model. Flow diagram 300 includes seven blocks 302-310, 308(1), and 308(2). Implementations of flow diagram 300 may be realized, for example, as processor-executable instructions and/or as part of image manipulator 106 (of FIG. 1) or processing system 210 (of FIG. 2). Example relatively quantitative embodiments for implementing flow diagram 300 are described below using the concepts, terms, and variables of FIGS. 4 and 5.

Figure 7:
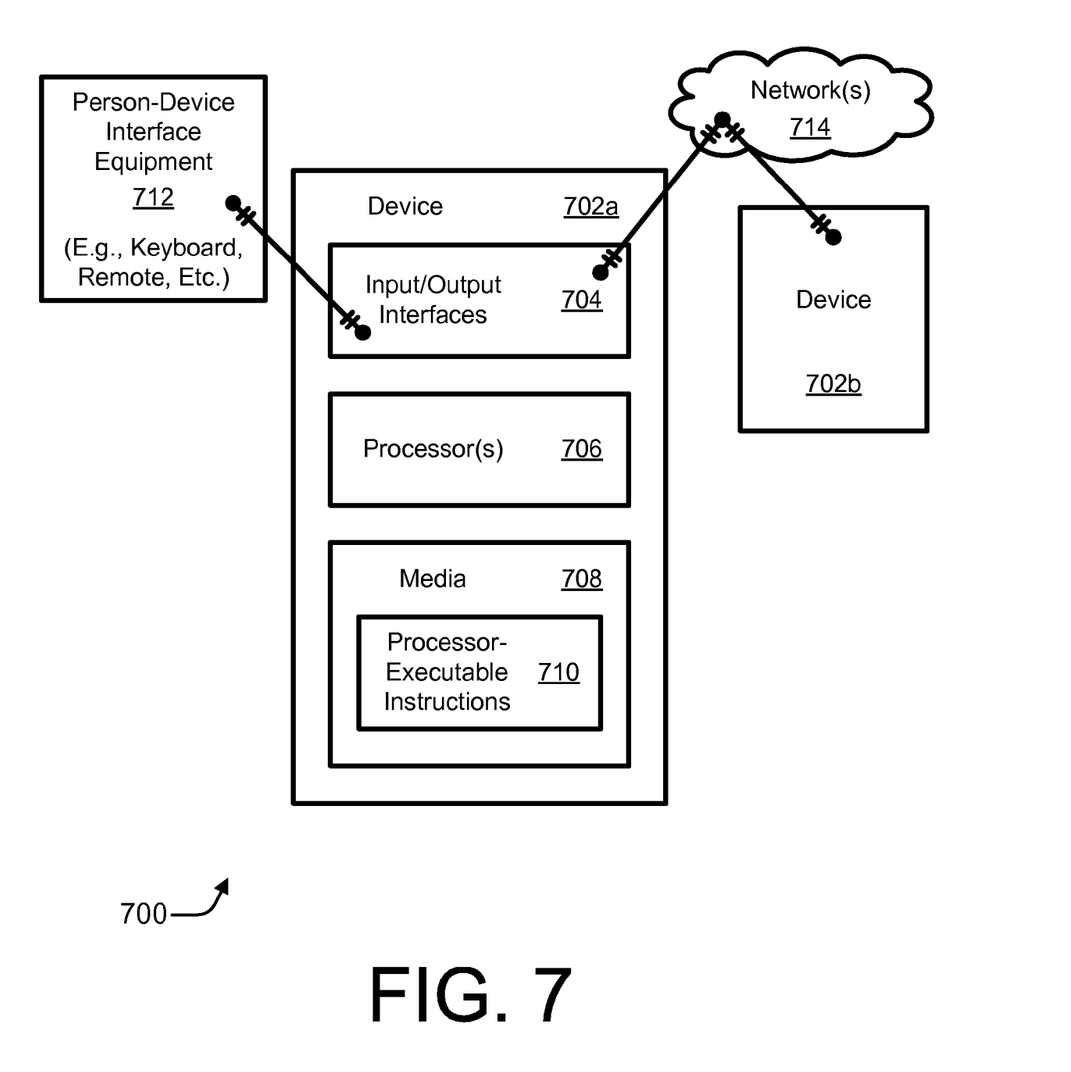
FIG. 7 is a block diagram illustrating example devices that may be used to implement embodiments for dehazing an image using a three-dimensional reference model.

The acts of flow diagram 300 that are described herein may be performed in many different environments and with a variety of different devices, such as by one or more processing devices (e.g., of FIG. 7). The order in which the method is described is not intended to be construed as a limitation, and any number of the described blocks can be combined, augmented, rearranged, and/or omitted to implement a respective method, or an alternative method that is equivalent thereto. Although specific elements of certain other FIGS. (e.g., FIGS. 1 and 2) are referenced in the description of this flow diagram, the method may be performed with alternative elements.

For example embodiments, at block 302, an image is received. For example, user 208 may store, input, upload, or otherwise provide image 102. At block 304, the image is registered to a reference model. For example, user 208 may register image 102 in conjunction with one or more reference models 104 using processing system 210. At block 306, an image manipulation operation request is received. For example, processing system 210 and/or image manipulator 106 may receive a request to perform a dehazing operation 110. The request may be submitted by user 208 upon providing image 102, may be selected by user 208 from among a set of image manipulation options, and so forth.

At block 308, the image is manipulated based on the reference model and responsive to the requested manipulation operation. For example, image 102 may be manipulated with image manipulator 106 by performing dehazing operation 110 on image 102 based on reference model 104.

More specifically, at block 308(1), a haze curve is estimated based on a relationship between colors in the image and colors and depths of the reference model. For example, a haze curve representing the haze conditions under which image 102 was captured may be estimated based on at least one relationship between the colors in image 102 and the colors of reference model 104. For instance, colors averaged over predetermined depth ranges may be mapped between reference model 104 and image 102.

At block 308(2), a modified (e.g., dehazed) image may be produced by using the estimated haze curve to reduce haze in the image. For example, an estimated haze curve that represents the effects of haze on observed intensities at a registered camera point may be employed to reduce haze in image 102.

At block 310, a modified image is output. For example, modified image 108, which is a dehazed version of image 102, may be output. Modified image 108 may be, for instance, stored to memory, transmitted over one or more networks (e.g., back to user 208), displayed on a screen, printed on paper, some combination thereof, and so forth.

Figure 4:
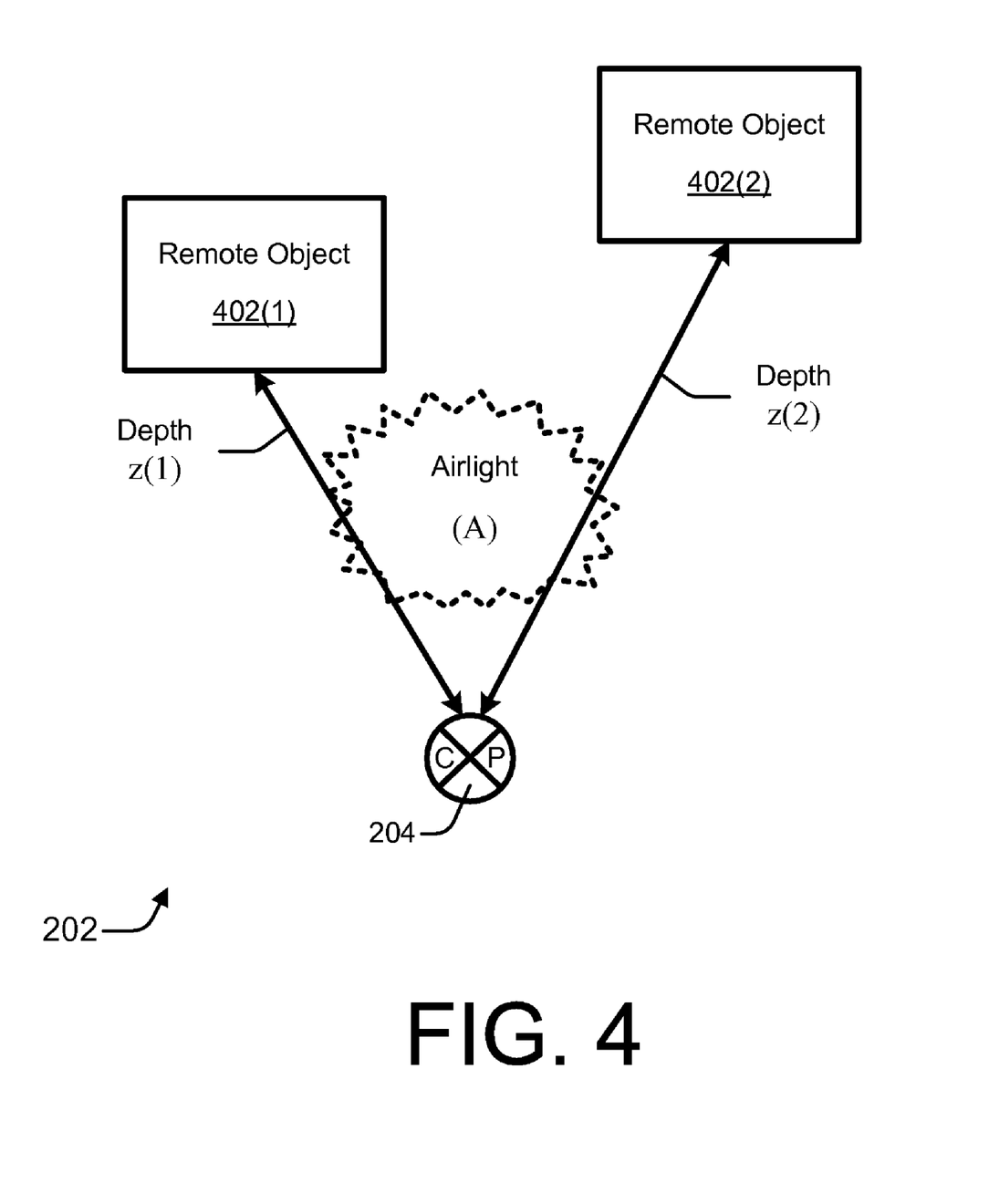
FIG. 4 is a block diagram of a real-world environment that illustrates example factors that are related to haze and impact observed intensities when an image is captured.

FIG. 4 is a block diagram of real-world environment 202 that illustrates example factors that are related to haze and impact observed intensities when an image is captured. As illustrated, example real-world environment 202 includes camera position 204 and multiple remote objects 402. Specifically, two remote objects 402(1) and 402(2) are shown. However, more or fewer remote objects 402 may be present in an image.

In example embodiments, a remote object 402 may be any object that is not in the foreground of the image. Examples of remote objects 402 include, but are not limited to, buildings, hills/mountains, the horizon, the sky, a beach, a prairie, bodies of water, or other distant objects that are capable of being captured in an image. Remote objects 402 are generally represented in reference models 104.

Between camera position 204 and each remote object 402, a respective depth z may be defined. Thus, a depth z(1) is definable between camera position 204 and remote object 402(1), and a depth z(2) is definable between camera position 204 and remote object 402(2). Airlight A is also present between camera position 204 and remote objects 402. Airlight A contributes to the effect of haze.

Figure 5:
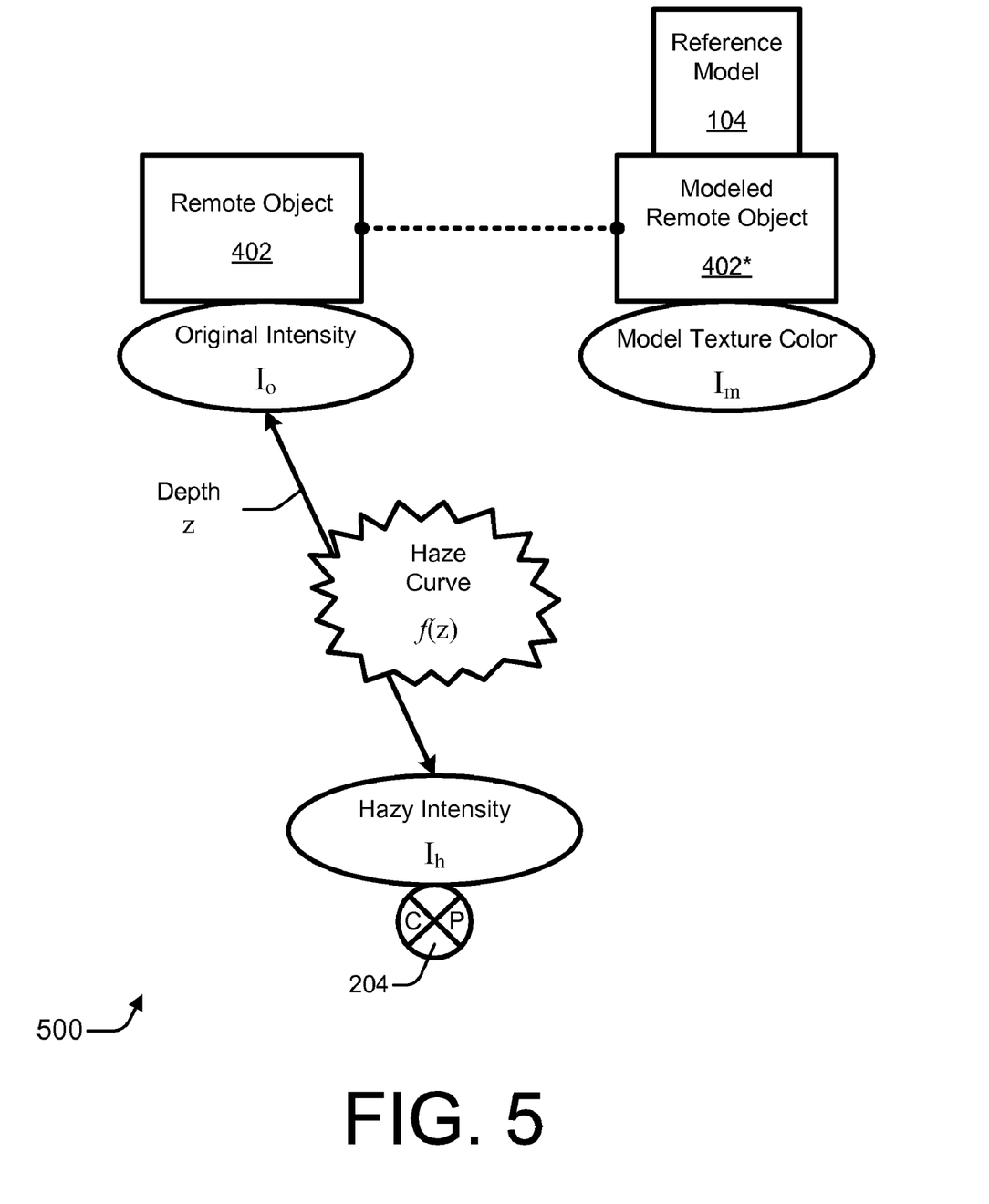
FIG. 5 is a block diagram including an example haze curve that represents the effect of haze, which causes an original intensity to be attenuated to a hazy intensity.

FIG. 5 is a block diagram 500 including an example haze curve f(z) that represents the effect of haze, which causes an original intensity $I_o$ to be attenuated to a hazy intensity $I_h$. As illustrated, block diagram 500 includes a remote object 402 having an original intensity $I_o$ and a modeled remote object 402* having a model texture color $I_m$. Modeled remote object 402* corresponds to remote object 402. Modeled remote object 402* is part of reference model 104.

Typically, original intensity $I_o$ at remote object 402 is attenuated by haze until it is captured by a camera as hazy intensity $I_h$ at camera position 204. The effects of haze (e.g., haze per se, fog, other atmospheric phenomena, etc.) are usually dependent upon a respective depth z between camera position 204 and a respective remote object 402. In example embodiments, a haze curve f(z) represents the attenuating effect of haze as a function of depth z. Example principles for a haze curve f(z) are described herein below. Additionally, example implementations for estimating a haze curve f(z) and employing the estimation to dehaze an image are described below.

Example quantitative approaches to dehazing are described next. As explained above, atmospheric phenomena, such as haze and fog, can reduce the visibility of relatively distant regions in images of outdoor scenes. Due to atmospheric absorption and scattering, only part of the light reflected from remote objects reaches the camera. Furthermore, this light is mixed with airlight, which is scattered ambient light present between the remote object and the camera. Consequently, remote objects in the scene typically appear considerably lighter and relatively featureless, as compared to proximate objects.

If the depth at each image pixel is determined, in theory it is possible to remove the effects of haze by fitting an analytical model as presented in Equation (1):

$$I_h = I_o f(z) + A(1 - f(z)). \quad (1)$$

In Equation (1), $I_h$ is the observed hazy intensity at a pixel, $I_o$ is the original intensity reflected towards the camera from the corresponding scene point, and A is the airlight. Also, $f(z) = \exp(-\beta z)$ is the attenuation in intensity as a function of distance (depth) due to outscattering. Thus, after estimating the parameters A and $\beta$, the original intensity $I_o$ may be recovered by inverting the model as shown in Equation (2):

$$I_o = A + (I_h - A) \frac{1}{f(z)}. \quad (2)$$

This model assumes single-scattering and a homogeneous atmosphere. Hence, it is more suitable for short ranges of distance and might fail to correctly approximate the attenuation of scene points that are more than, e.g., a few kilometers away. Furthermore, because the exponential attenuation decreases quickly to zero, noise might be severely amplified in the remote areas. Although reducing the degree of dehazing and/or regularization may be used to alleviate the problems derived from the model assumptions, these possibilities cannot completely solve the model's problems.

Instead, for certain example embodiments, stable values for the haze curve f(z) are estimated directly from the relationship between the colors in the image and the colors and depths of the model textures. More specifically, a have curve f(z) and an airlight value A are computed such that Equation (2) maps averages of colors in the image to the corresponding averages of (e.g., color-corrected) model texture colors. These parameters may be estimated automatically as described below.

For robustness, certain example implementations operate on averages of colors over depth ranges. For each value of z, the average model texture color $\hat{I}_m(z)$ is computed for those pixels whose depth is in a predetermined range defined by $[z-\delta, z+\delta]$, as well as the average hazy image color $\hat{I}_h(z)$ for the same pixels. Although other depth interval parameter $\delta$ values may be used, an example value is 500 meters. The averaging over depth ranges reduces the sensitivity to model texture artifacts, such as registration and stitching errors, bad pixels, contained shadows and clouds, and so forth.

It should be noted that model textures typically have a global color bias as compared to images from "standard" cameras. For instance, Landsat uses seven sensors whose spectral responses differ from that of the typical RGB sensors in cameras. Thus, the colors in the resulting model textures are merely approximations to the ones that would have been captured by an RGB-based camera. This color bias may be corrected by measuring the ratio between the image and the texture colors in the foreground (e.g., in each channel) and then by using these ratios to correct the colors of the entire texture. More precisely, a global multiplicative correction factor (e.g., vector) C may be calculated as shown in Equation (3):

$$C = \frac{F_h}{lum(F_h)} \bigg/ \frac{F_m}{lum(F_m)}, \quad (3)$$

where $F_h$ is the average of $\hat{I}_h(z)$ with $z < z_F$, and $F_m$ is a similarly computed average of the model texture. The function "lum(c)" denotes the luminance of a color c. Although other values for a foreground threshold depth $z_F$ may be used, an example value for $z_F$ is 1600 meters.

For more detailed example embodiments, the haze curve f(z) may be computed as described below. Ignoring for the moment the physical interpretation of A and f(z), Equation (2) may be considered to simply stretch the intensities of the image around A, using the scale coefficient $f(z)^{-1}$. The intention is to find an airlight value A and haze curve f(z) that can map the hazy image colors $\hat{I}_h(z)$ to the color-corrected texture colors $C\hat{I}_m(z)$. Substituting $\hat{I}_h(z)$ for $I_h$, and $C\hat{I}_m(z)$ for $I_o$, into Equation (2) produces Equation (4):

$$f(z) = \frac{\hat{I}_h(z) - A}{C\hat{I}_m(z) - A}. \quad (4)$$

Different choices of A will result in different scaling curves f(z). For example implementations, the airlight variable is set to A=1 because this guarantees $f(z) \geq 0$. Other values of A may be implemented instead. However, using A>1 can result in larger values of f(z), and hence less contrast in the dehazed image. Also, using A<1 might be prone to instabilities.

The recovered haze curve f(z) enables the effective restoration of the contrasts in the image. However, the colors in the background may undergo a color shift. Compensation for this color shift may be performed. This compensation may be performed by adjusting the airlight A, while keeping the haze curve f(z) fixed, such that after the adjustment the dehazing preserves the colors of the image in the background.

For example implementations, when adjusting the airlight A, the average background color $B_h$ of the image is first computed as the average of $\hat{I}_h(z)$ with $z > z_B$. Second, a similarly computed average of the model texture $B_m$ is made. Although other values for the background threshold depth $z_B$ may be selected, an example value is 5000 meters. The color of the background is preserved if the ratio of Equation (5)

$$R = \frac{A + (B_h - A) \cdot f^{-1}}{B_h}, \quad f = \frac{B_h - 1}{B_m - 1} \quad (5)$$

has the same value for each color channel. Thus, Equation (5) may be rewritten to obtain the adjusted airlight A as shown in Equation (6)

$$A = B_h \frac{R - f^{-1}}{1 - f^{-1}}, \quad (6)$$

with R set to be $R = \max(B_{m,red}/B_{h,red}, B_{m,green}/B_{h,green}, B_{m,blue}/B_{h,blue})$. This particular choice of R results in the maximum A that guarantees A=1. Finally, Equation (2) along with the recovered have curve f(z) and the adjusted airlight A are used to dehaze the image.

It should be understood that in practice one might not want to remove the haze completely as has been described herein above because haze sometimes provides perceptually-significant depth cues. Moreover, dehazing typically amplifies some noise in regions where little or no visible detail remains in the original image. Nevertheless, at least most outdoor scenic images benefit from some degree of dehazing. If desired, the dehazing as described herein may be downscaled to decrease the degree of dehazing.

A model for the haze in an image may be obtained using the approaches described above. With this model, new "remote" objects may be inserted into the scene in a more seamless fashion by applying the haze model to these objects as well. More specifically, the model may be applied to the inserted remote object in accordance with the depth at which the object is intended to be inserted. Computationally, application of the model may be accomplished by inverting Equation (2) to produce Equation (7):

$$I_h = A + (I_o - A)f(z). \quad (7)$$

The determined values of the airlight A and the haze curve f(z) are used to produce hazy intensity $I_h$ values from original intensity $I_o$ values responsive to the insertion depth z.

Thus, in example embodiments, an average model texture color over at least one depth range is computed for a reference model. An average hazy image color over the at least one depth range is computed for an image. A haze curve for the image is computed based on the average model texture color and responsive to the average hazy image color (e.g., using Equation (4)). Contrasts in the image can then be restored using the haze curve to thereby dehaze the image and produce a dehazed image (e.g., with Equation (2)).

The haze curve may be computed for the image with an airlight value. If so, the airlight value may be adjusted to compensate for color shifts. Furthermore, the adjusting may include the following acts: computing an average hazy background color with respect to the image; computing an average model background color with respect to the reference model; and adjusting the airlight value based on the average model background color and responsive to the average hazy background color (e.g., using Equations (5) and (6)). The airlight value may further be adjusted responsive to respective red-green-blue components of the average model background color and the average hazy background color (e.g., to set R for Equation (6)).

When the spectral response differs between the texture colors of the reference model and the image, the following approach may be implemented. An average hazy foreground color with respect to the image and an average model foreground color with respect to the reference model are computed. A color correction factor based on the average model foreground color and responsive to the average hazy foreground color is computed (e.g., using Equation (3)). The computation of the haze curve (e.g., with Equation (4)) for the image may then be based on a color-corrected average model texture color using the color correction factor.

When an object is to be added to the background of the image, haze may be applied to the object using a version of the haze curve (e.g., from Equation (7)) that is tuned to a particular depth at which the object is to be inserted into the image. The object may then be inserted into the image at the particular depth with the applied haze.

Figure 6:
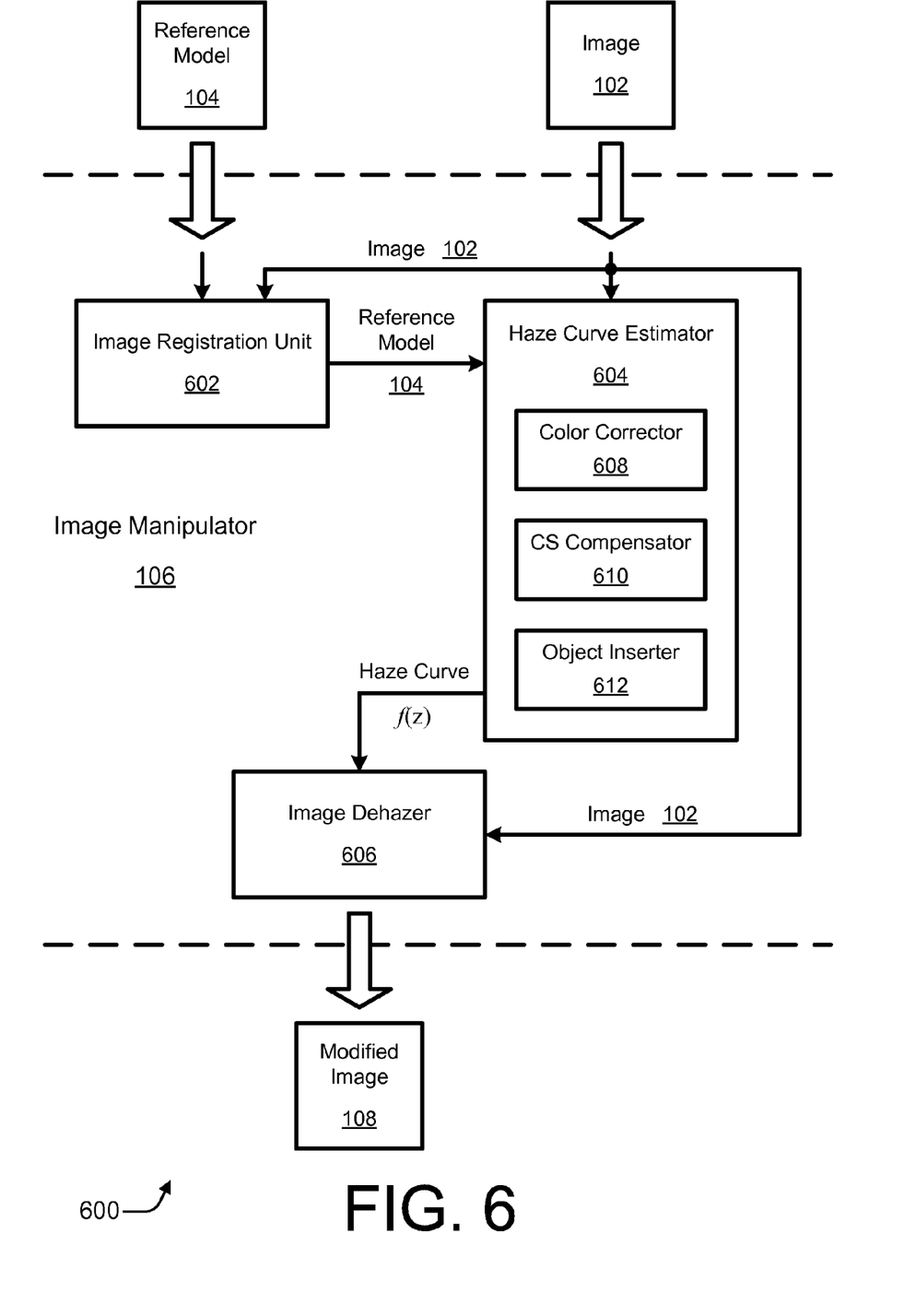
FIG. 6 is a block diagram of an example image manipulator that enhances an image by producing a modified image from a reference model using an image dehazer.

FIG. 6 is a block diagram 600 of an example image manipulator 106 that enhances an image 102 by producing a modified image 108 from a reference model 104 using an image dehazer 606. As illustrated, image manipulator 106 includes an image registration unit 602, a haze curve estimator 604, and image dehazer 606. Haze curve estimator 604 includes a color corrector 608, a color shift compensator 610, and an object inserter 612.

Image 102 and reference model 104 are input to image manipulator 106. Image 102 and reference model 104 are each provided to both image registration unit 602 and haze curve estimator 604. Haze curve estimator 604 outputs an estimated haze curve f(z). Image dehazer 606 accepts as input image 102 and estimated haze curve f(z). Image dehazer 606 outputs modified image 108.

Thus, for certain example embodiments, image manipulator 106 includes an image registration unit 602, a haze curve estimator 604, and image dehazer 606. Image registration unit 602 registers an image 102, which includes haze, to one or more reference models 104. Haze curve estimator 604 estimates a haze curve for image 102 based on at least one relationship between colors in image 102 and colors and depths of the one or more reference models 104. Image dehazer 606 produces a dehazed image (modified image 108) by using the estimated haze curve to reduce the haze of image 102.

Haze curve estimator 604 may compute the haze curve and an airlight value such that an equation relating original intensity and hazy intensity maps averages of the colors in image 102 to corresponding averages of the colors of texture maps of reference models 104. The averages of the colors of the texture maps of reference models 104 and the averages of the colors in image 102 may be calculated over at least one depth range by considering pixels within a predetermined depth range interval.

Color corrector 608 may correct the color bias in a texture of reference model 104 by measuring a ratio between average foreground colors of image 102 and average foreground colors of reference model 104. Object inserter 612 may apply haze to an object using a version of the estimated haze curve that is tuned to a particular depth at which the object is to be inserted into image 102. Object inserter 612 may then insert the object into image 102 at the particular depth with the applied haze.

In certain example implementations, haze curve estimator 604 may also estimate the haze curve by mapping average hazy image colors in image 102 to average model texture colors of reference models 104. Color shift compensator 610 may compensate for color shift in background colors of image 102 by adjusting an airlight value so as to preserve the background colors responsive to a ratio that depends on an average background color in image 102 and an average background color from the model texture colors of reference models 104.

FIG. 7 is a block diagram 700 illustrating example devices 702 that may be used to implement embodiments for dehazing an image using a three-dimensional reference model. As illustrated, block diagram 700 includes two devices 702a and 702b, person-device interface equipment 712, and one or more network(s) 714. As explicitly shown with device 702a, each device 702 may include one or more input/output interfaces 704, at least one processor 706, and one or more media 708. Media 708 may include processor-executable instructions 710.

For example embodiments, device 702 may represent any processing-capable device. Example devices 702 include personal or server computers, workstations, hand-held or other portable electronics, entertainment appliances, network components, some combination thereof, and so forth. Device 702a and device 702b may communicate over network(s) 714.

Network(s) 714 may be, by way of example but not limitation, an internet, an intranet, an Ethernet, a public network, a private network, a cable network, a digital subscriber line (DSL) network, a telephone network, a wireless network, some combination thereof, and so forth. Image submission and manipulation may both be performed at one device 702. Alternatively, a user may submit an image at one device 702a, and the image manipulation may occur at another device 702b. Regardless, reference models may be located at the same or a different device 702 (e.g., that is likewise accessible over network 714). Person-device interface equipment 712 may be a keyboard/keypad, a touch screen, a remote, a mouse or other graphical pointing device, a display screen, a speaker, and so forth. Person-device interface equipment 712 may be integrated with or separate from device 702a.

I/O interfaces 704 may include (i) a network interface for monitoring and/or communicating across network 714, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 712. A given interface may function as both a display device interface and a person-device interface.

Processor 706 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 708 may be any available media that is included as part of and/or is accessible by device 702. It includes volatile and non-volatile media, removable and non-removable media, storage and transmission media (e.g., wireless or wired communication channels), hard-coded logic media, combinations thereof, and so forth. Media 708 is tangible media when it is embodied as a manufacture and/or as a composition of matter.

Generally, processor 706 is capable of executing, performing, and/or otherwise effectuating processor-executable instructions, such as processor-executable instructions 710. Media 708 is comprised of one or more processor-accessible media. In other words, media 708 may include processor-executable instructions 710 that are executable by processor 706 to effectuate the performance of functions by device 702. Processor-executable instructions 710 may be embodied as software, firmware, hardware, fixed logic circuitry, some combination thereof, and so forth.

Thus, realizations for dehazing an image using a three-dimensional reference model may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 708 comprises at least processor-executable instructions 710. Processor-executable instructions 710 may comprise, for example, image manipulator 106 (of FIGS. 1 and 6) and/or processing system 210 (of FIG. 2). Generally, processor-executable instructions 710, when executed by processor 706, enable device 702 to perform the various functions described herein. Such functions include, by way of example but not limitation, those that are illustrated in flow diagram 300 (of FIG. 3) and those pertaining to features illustrated in the various block diagrams, approaches, and schemes, as well as combinations thereof, and so forth.

The devices, acts, features, functions, methods, modules, data structures, techniques, components, etc. of FIGS. 1-7 are illustrated in diagrams that are divided into multiple blocks and other elements. However, the order, interconnections, interrelationships, layout, etc. in which FIGS. 1-7 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for dehazing an image using a three-dimensional reference model.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible tangible media comprising processor-executable instructions for dehazing an input image, wherein the processor-executable instructions, when executed, direct a device to perform acts comprising:
    registering the input image to a reference model comprising a 3D geometric model of a scene corresponding to at least part of the input image to determine depth ranges of the input image;
    computing an average model texture color over at least one depth range of the reference model;
    computing an average hazy image color over the at least one depth range of the input image;
    computing an estimated haze curve for the input image based on the average model texture color and responsive to the average hazy image color, the estimated haze curve being a function of depth; and
    restoring contrasts in the input image using the estimated haze curve to thereby dehaze the input image and produce a dehazed image.

2. The one or more processor-accessible tangible media as recited in claim 1, wherein the act of computing an estimated haze curve comprises computing the estimated haze curve for the input image with an airlight value; and wherein the processor-executable instructions, when executed, direct the device to perform a further act comprising:
    adjusting the airlight value to compensate for color shifts.

3. The one or more processor-accessible tangible media as recited in claim 2, wherein the act of adjusting comprises:
    computing an average hazy background color with respect to the input image;
    computing an average model background color with respect to the reference model; and
    adjusting the airlight value based on the average model background color and responsive to the average hazy background color.

4. The one or more processor-accessible tangible media as recited in claim 3, wherein the act of adjusting further comprises:

adjusting the airlight value responsive to respective red-green-blue components of the average model background color and the average hazy background color.

5. The one or more processor-accessible tangible media as recited in claim 1, wherein the processor-executable instructions, when executed, direct the device to perform further acts comprising:
computing an average hazy foreground color with respect to the input image;
computing an average model foreground color with respect to the reference model; and
computing a color correction factor based on the average model foreground color and responsive to the average hazy foreground color;
wherein the act of computing an estimated haze curve comprises computing the estimated haze curve for the input image based on a color-corrected average model texture color using the color correction factor.

6. The one or more processor-accessible tangible media as recited in claim 1, wherein the processor-executable instructions, when executed, direct the device to perform further acts comprising:
applying haze to an object using a version of the estimated haze curve that is tuned to a particular depth at which the object is to be inserted into the input image; and
inserting the object into the input image at the particular depth with the applied haze.

7. A device-implemented method for dehazing an input image, the method comprising acts of:
registering the input image having haze to one or more reference models to determine depth ranges of the input image, each reference model comprising a 3D geometric model of a scene corresponding to at least part of the input image;
estimating a haze curve for the input image based on at least one relationship between colors and depths in the input image and colors and depths of the one or more reference models; and
producing a dehazed image by using the estimated haze curve to reduce the haze of the input image.

8. The method as recited in claim 7, wherein the act of estimating comprises:
computing the estimated haze curve and an airlight value such that an equation relating original intensity and hazy intensity maps averages of the colors in the input image to corresponding averages of the colors of texture maps of the one or more reference models.

9. The method as recited in claim 8, wherein the act of computing comprises:
calculating the averages of the colors of the texture maps of the one or more reference models over at least one depth range by considering pixels of the model within at least one predetermined depth range.

10. The method as recited in claim 7, wherein the act of estimating comprises:
correcting color bias in a texture of the one or more reference models by measuring a ratio between average foreground colors of the input image and average foreground colors of the one or more reference models using at least one foreground threshold depth.

11. The method as recited in claim 7, wherein the act of estimating comprises:
estimating the estimated haze curve by mapping average hazy image colors in the input image to average model texture colors of the one or more reference models over one or more depth ranges.

12. The method as recited in claim 11, wherein the act of estimating further comprises:
estimating the estimated haze curve by mapping the average hazy image colors in the input image to color-corrected average model texture colors of the one or more reference models.

13. The method as recited in claim 11, wherein the act of estimating further comprises:
compensating for color shift in background colors of the input image by adjusting an airlight value.

14. The method as recited in claim 13, wherein the act of compensating further comprises:
preserving the background colors responsive to a ratio that depends on an average background color in the input image and an average background color from the model texture colors of the one or more reference models using at least one background threshold depth.

15. The method as recited in claim 7, further comprising:
applying haze to an object using a version of the estimated haze curve that is tuned to a particular depth at which the object is to be inserted into the input image; and
inserting the object into the input image at the particular depth with the applied haze.

16. A device that is capable of dehazing an input image, the device comprising:
an image registration unit to register the input image having haze to one or more reference models to determine depth ranges of the input image, each reference model comprising a 3D geometric model of a scene corresponding to at least part of the input image;
a haze curve estimator to estimate a haze curve for the input image based on at least one relationship between colors and depths in the input image and colors and depths of the one or more reference models; and
an image dehazer to produce a dehazed image by using the estimated haze curve to reduce the haze of the input image.

17. The device as recited in claim 16, wherein the haze curve estimator is further configured to compute the estimated haze curve and an airlight value such that an equation relating original intensity and hazy intensity maps averages of the colors in the input image to corresponding averages of the colors of texture maps of the one or more reference models; and wherein the averages of the colors of the texture maps of the one or more reference models and the averages of the colors in the input image are to be calculated over at least one depth range by considering pixels within at least one predetermined depth range.

18. The device as recited in claim 16, wherein the haze curve estimator comprises:
a color corrector to correct color bias in a texture of the one or more reference models by measuring a ratio between average foreground colors of the input image and average foreground colors of the one or more reference models.

19. The device as recited in claim 16, wherein the haze curve estimator is further configured to estimate the estimated haze curve by mapping average hazy image colors in the input image to average model texture colors of the one or more reference models; and wherein the haze curve estimator comprises:
a color shift compensator to compensate for color shift in background colors of the input image by adjusting an airlight value so as to preserve the background colors responsive to a ratio that depends on an average background color in the input image and an average background color from the model texture colors of the one or more reference models.

20. The device as recited in claim 16, wherein the haze curve estimator comprises:
an object inserter to apply haze to an object using a version of the estimated haze curve that is tuned to a particular depth at which the object is to be inserted into the input image; wherein the object inserter is to insert the object into the input image at the particular depth with the applied haze.

* * * * *